No. 834,608. PATENTED OCT. 30, 1906.
W. DUNBAR.
MOLD FOR RUBBER TIRES, &c.
APPLICATION FILED MAR. 30, 1905.

WITNESSES:
Herbert Bradley.
Fred Kirchner.

INVENTOR
Wilmer Dunbar,
by Christy & Christy, Atty's

UNITED STATES PATENT OFFICE.

WILMER DUNBAR, OF AKRON, OHIO.

MOLD FOR RUBBER TIRES, &c.

No. 834,608. Specification of Letters Patent. Patented Oct. 30, 1906.

Application filed March 30, 1905. Serial No. 252,824.

*To all whom it may concern:*

Be it known that I, WILMER DUNBAR, a citizen of the United States, residing at Akron, in the county of Summit and State of Ohio, have invented or discovered certain new and useful Improvements in Molds for Rubber Tires, &c., of which improvements the following is a specification.

The invention described herein relates to certain improvements in vulcanizing molds for the manufacture of rubber articles, the improvements being especially applicable to manufacture of rubber tires. A vulcanizing-mold consists of two box-like parts or members having passages for the flow of a suitable heating fluid. In the adjacent faces of the mold-sections are formed matrices for the reception of the article to be treated. Hence it is necessary to have molds for the different articles to be manufactured. The molds for tires are necessarily quite long, and therefore expensive, and, although several matrices are formed in each mold, if a new shape or style of tire is required an entire new mold must be provided.

The object of the present invention is to provide the adjacent faces of the mold-boxes with removable and interchangeable sections in which the matrices for the articles are formed.

The invention is hereinafter more fully described and claimed.

Figure 1:
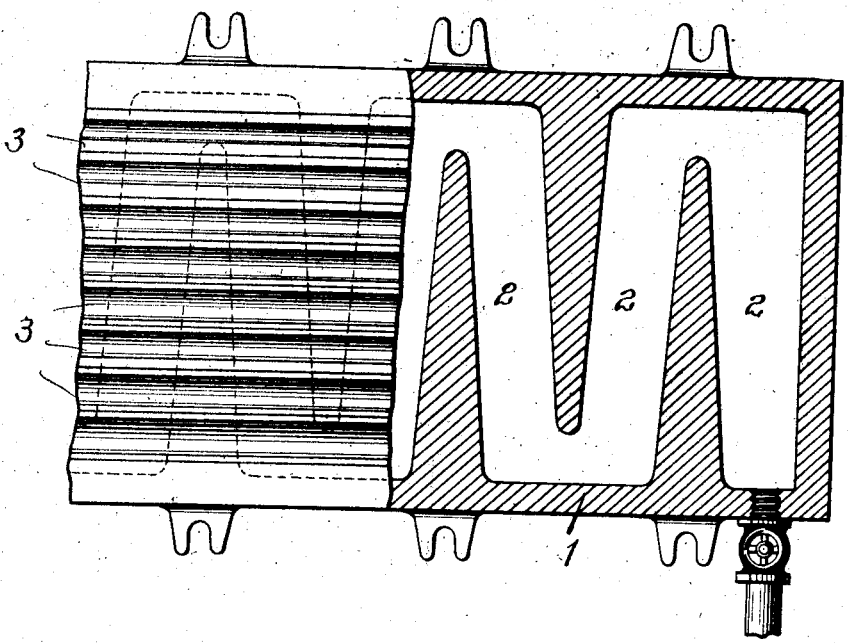
Figure 2:
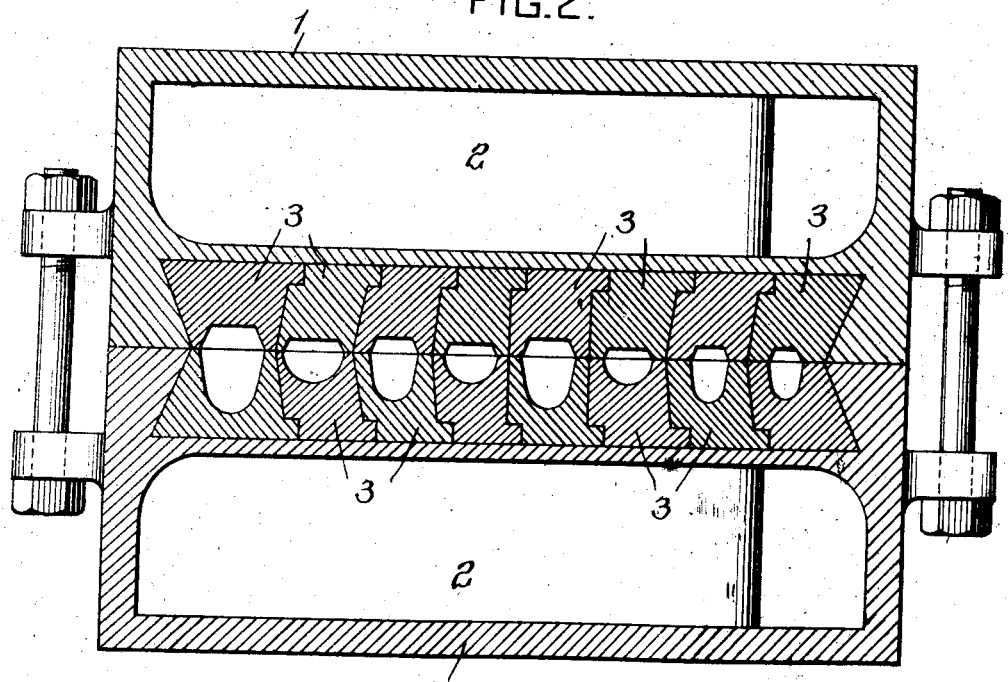

In the accompanying drawings, forming a part of this specification, Figure 1 is a plan view of a portion of one of the mold-sections, the upper portion being broken away; and Fig. 2 is a sectional elevation showing the mold-sections arranged in operative relation.

In the practice of my invention each mold-section consists of a body portion 1, having passages 2 therethrough for the flow of a heating fluid, as steam. The inner or adjacent of these body portions are recessed for the reception of removable sections 3, in which are formed the matrices. The outer walls of the recesses in the body portions are constructed, as by undercutting, to engage the side walls of the outer sections, while the inner sections are constructed to engage and interlock with adjacent sections in each side. It is preferred to so construct the sections that any one or more can be removed and an equal number substituted, one of the sections operating as a key to lock the other sections in position.

In molds for the manufacture of tires the recesses extend along the adjacent walls of the body portions. The side walls are undercut for engagement with the complementary walls of the outer sections. Each of the inner sections is provided with a rib on one side and a groove on the opposite side for the reception of the rib on an adjacent section. By thus constructing the sections the sections are interlocked with each other and securely locked to the body portions. This construction permits of the ready substitution of matrices as required to fill orders, and only a large number of sections, which are comparatively inexpensive, need be carried in stock.

I claim herein as my invention—

A vulcanizing-mold having in combination body portions having recesses in their inner or adjacent faces and a series of removable sections having matrices, the intermediate sections being constructed to interlock with adjacent sections and the sections at the ends of the series with the walls of the recesses in the body portion, substantially as set forth.

In testimony whereof I have hereunto set my hand.

WILMER DUNBAR.

Witnesses:
CHARLES BARNETT,
FRED KIRCHNER.